United States Patent [19]

Ide et al.

[11] 4,146,874
[45] Mar. 27, 1979

[54] METHOD AND APPARATUS FOR ADDRESSING A CHARACTER GENERATOR

[75] Inventors: Richard A. Ide, Little Meadows, Pa.; John D. Wilcox, Owego, N.Y.

[73] Assignee: International Business Machines Corporation, Armonk, N.Y.

[21] Appl. No.: 888,087

[22] Filed: Mar. 20, 1978

[51] Int. Cl.² .............................................. G06F 3/14
[52] U.S. Cl. ...................... 340/146.3 MA; 178/23 A
[58] Field of Search ....... 340/324 AD, 324 R, 324 M, 340/146.3 MA, 146.3 AH, 146.3 R; 364/900 MS File, 200 MS File; 360/48, 49; 235/92 ST; 358/296

[56] References Cited

U.S. PATENT DOCUMENTS

| | | | |
|---|---|---|---|
| 3,480,943 | 11/1969 | Manber | 340/324 AD |
| 3,599,178 | 8/1971 | Jackson et al. | 340/324 AD |
| 3,609,743 | 9/1971 | Lasoff et al. | 340/324 AD |
| 3,928,845 | 12/1975 | Clark | 340/324 AD |
| 4,068,224 | 1/1978 | Bechtle et al. | 340/324 AD |
| 4,070,662 | 1/1978 | Narveson | 340/324 AD |

OTHER PUBLICATIONS

Dattilo et al., "Proportional Spacing Raster Printer Character Generator", *IBM Tech. Disclosure Bulletin*, vol. 15, No. 8, Jan., 1973, pp. 2365–2366.

*Primary Examiner*—Leo H. Boudreau
*Attorney, Agent, or Firm*—Kenneth P. Johnson

[57] ABSTRACT

Method and apparatus for supplying to marking means, character bit data from a two-dimensional matrix of rows and columns of storage elements wherein character selection is made by specifying the character storage cell and character width. Characters are symmetrically stored about the vertical axis of a preassigned matrix having an even number of columns and the binary width data are translated as starting and stopping addresses on opposite sides of the axis for readout of columns therebetween. The center storage of the character with clear margins enables the raw binary width data to be used as one edge address and its complement to be used as the other address in determining the width of the character to be retrieved and printed. Proportional spacing and justification are simply achieved by varying the width data as required.

18 Claims, 5 Drawing Figures

| WIDTH IN PELS | BINARY BITS | | | | |
|---|---|---|---|---|---|
| | 16 | 8 | 4 | 2 | 1 |
| 2 | 0 | 0 | 0 | 0 | 1 |
| 4 | 0 | 0 | 0 | 1 | 1 |
| 6 | 0 | 0 | 1 | 0 | 1 |
| 8 | 0 | 0 | 1 | 1 | 1 |
| 10 | 0 | 1 | 0 | 0 | 1 |
| 12 | 0 | 1 | 0 | 1 | 1 |
| 14 | 0 | 1 | 1 | 0 | 1 |
| 16 | 0 | 1 | 1 | 1 | 1 |
| 18 | 1 | 0 | 0 | 0 | 1 |
| 20 | 1 | 0 | 0 | 1 | 1 |
| 22 | 1 | 0 | 1 | 0 | 1 |
| 24 | 1 | 0 | 1 | 1 | 1 |
| 26 | 1 | 1 | 0 | 0 | 1 |
| 28 | 1 | 1 | 0 | 1 | 1 |
| 30 | 1 | 1 | 1 | 0 | 1 |
| 32 | 1 | 1 | 1 | 1 | 1 |

FIG. 3

| 16 | 8 | 4 | 2 | 16 | 8 | 4 | 2 | 16 | 8 | 4 | 2 | PEL WIDTH | 16 | 8 | 4 | 2 | 16 | 8 | 4 | 2 |
|---|---|---|---|---|---|---|---|---|---|---|---|---|---|---|---|---|---|---|---|---|
| | | | | | | | | 16 | 8 | 4 | 2 | | 16 | 8 | 4 | 2 | | | | |
| | | | | 16 | 8 | 4 | 2 | | | | | | | | | | 16 | 8 | 4 | 2 |
| 0 | 1 | 1 | 1 | 1 | 1 | 1 | 1 | 1 | 1 | 1 | 1 | 2 | 1 | 0 | 0 | 0 | 1 | 0 | 0 | 0 |
| 0 | 1 | 1 | 0 | 1 | 1 | 1 | 0 | 1 | 1 | 1 | 0 | 4 | 1 | 0 | 0 | 1 | 1 | 0 | 0 | 1 |
| 0 | 1 | 0 | 1 | 1 | 1 | 0 | 1 | 1 | 1 | 0 | 1 | 6 | 1 | 0 | 1 | 0 | 1 | 0 | 1 | 0 |
| 0 | 1 | 0 | 0 | 1 | 1 | 0 | 0 | 1 | 1 | 0 | 0 | 8 | 1 | 0 | 1 | 1 | 1 | 0 | 1 | 1 |
| 0 | 0 | 1 | 1 | 1 | 0 | 1 | 1 | 1 | 0 | 1 | 1 | 10 | 1 | 1 | 0 | 0 | 1 | 1 | 0 | 0 |
| 0 | 0 | 1 | 0 | 1 | 0 | 1 | 0 | 1 | 0 | 1 | 0 | 12 | 1 | 1 | 0 | 1 | 1 | 1 | 0 | 1 |
| 0 | 0 | 0 | 1 | 1 | 0 | 0 | 1 | 1 | 0 | 0 | 1 | 14 | 1 | 1 | 1 | 0 | 1 | 1 | 1 | 0 |
| 0 | 0 | 0 | 0 | 1 | 0 | 0 | 0 | 1 | 0 | 0 | 0 | 16 | 1 | 1 | 1 | 1 | 1 | 1 | 1 | 1 |
| 0 | 0 | 0 | 0 | 0 | 1 | 1 | 1 | 1 | 1 | 1 | 1 | 18 | 1 | 0 | 0 | 0 | 1 | 0 | 0 | 0 |
| 0 | 0 | 0 | 0 | 0 | 1 | 1 | 0 | 1 | 1 | 1 | 0 | 20 | 1 | 0 | 0 | 1 | 1 | 0 | 0 | 1 |
| 0 | 0 | 0 | 0 | 0 | 1 | 0 | 1 | 1 | 1 | 0 | 1 | 22 | 1 | 0 | 1 | 0 | 1 | 0 | 1 | 0 |
| 0 | 0 | 0 | 0 | 0 | 1 | 0 | 0 | 1 | 1 | 0 | 0 | 24 | 1 | 0 | 1 | 1 | 1 | 0 | 1 | 1 |
| 0 | 0 | 0 | 0 | 0 | 0 | 1 | 1 | 1 | 0 | 1 | 1 | 26 | 1 | 1 | 0 | 0 | 1 | 1 | 0 | 0 |
| 0 | 0 | 0 | 0 | 0 | 0 | 1 | 0 | 1 | 0 | 1 | 0 | 28 | 1 | 1 | 0 | 1 | 1 | 1 | 0 | 1 |
| 0 | 0 | 0 | 0 | 0 | 0 | 0 | 1 | 1 | 0 | 0 | 1 | 30 | 1 | 1 | 1 | 0 | 1 | 1 | 1 | 0 |
| 0 | 0 | 0 | 0 | 0 | 0 | 0 | 0 | 1 | 0 | 0 | 0 | 32 | 1 | 1 | 1 | 1 | 1 | 1 | 1 | 1 |
| LEFT CELL HALF | | | | WIDTH BITS | | | | ADDRESS START BITS | | | | | WIDTH BITS | | | | RIGHT CELL HALF | | | |

| INTERFACE BITS | BINARY WEIGHT | DESCRIPTION |
|---|---|---|
| 0 | 2 | FONT SELECT (1 OF 4) |
| 1 | 1 | |
| 2 | 32 | CHARACTER SELECT (1 OF 64) |
| 3 | 16 | |
| 4 | 8 | |
| 5 | 4 | |
| 6 | 2 | |
| 7 | 1 | |
| 8 | | CONTROL BITS |
| 9 | | |
| 10 | | |
| 11 | | |
| 12 | 8 | VARIABLE CHARACTER WIDTH (VCW) (2,4,6,...,30,32) |
| 13 | 4 | |
| 14 | 2 | |
| 15 | 1 | |

FIG. 4

METHOD AND APPARATUS FOR ADDRESSING A CHARACTER GENERATOR

FIELD OF THE INVENTION

This invention relates to the retrieval from memory of character information for a printer, display device or other matrix output, and more particularly to retrieval of elemental bit data for the composition of characters formed by segmental marks.

BACKGROUND OF THE INVENTION

Printers which form characters by recording segments in a predetermined pattern are well known. Such printers generally comprise a print head having multiple recording members that are movable relative to a recording surface whereby each member is controlled by a data signal to form a mark on the surface. The marking members may be electrodes energizable to produce a color change in an electro-sensitive record surface, or wires operable to impact a ribbon against the record surface, or a light emitting device to control exposure or electrostatic charge of the surface, or, more recently, an ink jet nozzle emitting selectively controlled drops of ink to form a mark. These printers often require that the character data be supplied as binary bits in a strict time relationship in order to produce the character segments. Therefore, character generators are required having relatively large memories from which the binary data can be readily extracted. Upon addressing these memories, the data must be transferred, usually to a bit assembler, preparatory to subsequent transfer to the marking member itself.

Character resolution is usually determined by the number of print elements per unit area. Greater resolution requires the recording of a greater number of binary bits or character segments. If each character segment is represented as a binary bit, for example, a rectangular character having a resolution of 30 pels by 32 pels will require 960 bit storage elements. Each element has to be addressable and convertible between a zero state and a one state in order to show the absence or presence of a data bit. It will be appreciated that the amount of bit storage required becomes large when considering common instances of large character sets of 256 characters. Even more storage is required when multiple fonts are included. Because of this, the addressing of a particular character cell in memory becomes complex due to the length of the address.

Data bits for each character are usually stored in a character cell having rows and columns of bistable circuits or elements. These binary elements are each settable to represent the presence or absence of a bit for a preassigned segment of a character which is to be composed of corresponding rows and columns of marks. In the past, each character of a set has been assigned a cell of standard width, i.e., 16 or 20 columns. Addressing of the cell was accomplished by transmitting beginning and ending addresses for the memory readout or a beginning address and fixed value to be added thereto to serve as the ending address. Readout could occur in either direction by incrementing or decrementing the initial address each cycle. Further sophistication in the printing art has demanded the ability to print characters at variable pitch such as 10, 12 or 15 characters per inch. Therefore, the space between adjacent characters must be filled by printing blank or space characters of various widths in order to achieve the required pitch. Another alternative used has been that of providing multiple character sets in which the characters in each set have blank or clear spaces of different predetermined widths on each side of the character; this requires greater storage capacity. An example of this technique is disclosed in U.S. Pat. No. 3,971,044 to G. I. Findley, et al., commonly assigned to the assignee of the present invention.

SUMMARY OF THE INVENTION

Accordingly, it is a primary object of this invention to provide a method and apparatus having improved efficiency for selecting and transferring character data to printing means by simplifying character addressing in storage devices.

Another important object of this invention is to provide a method of storing character data for identification and readout which permits the selection of variable portions of a stored character and its background.

A further object of this invention is to provide a method for storing into and reading out characters from a stored character set which method has greater efficiency in selecting a character and greater versatility in reading out the character or portions of a character from within its storage cell.

A still further object of this invention is the provision of a storage method for characters in a character set in which each character is stored in its cell symmetrically about one axis of the cell and in which each stored character has a clear border on either side thereof within the cell.

Yet another object of this invention is to provide novel apparatus for addressing characters in a character generator by transmitting a binary character identification and width data for the selected character, and using both the true and complemented values of said width data as beginning and ending addresses in reading out the selected character.

The foregoing objects are accomplished in accordance with the invention by providing character generator means in which characters of one or more fonts are stored in selected locations in two-dimensional cells of multiple bit storage positions, then addressing by character selection data the rows and columns of said cells. The column addressing of said cells is done by using variable data defining the width of a selected character. Such width data is used in both true and complementary forms to define starting and ending addresses during the columnar readout. During the initial readout, the width data in one of these forms is used to address the starting column desired and then is decremented or incremented by one for each succeeding column according to reading direction, until a match occurs between the column address and the complement form of the binary width data at which time readout terminates.

The invention reduces the number of binary bits required for setting the character selection and starting and stopping addresses, and further decreases the number of circuits heretofore required. Additionally, the amount of clear area on either side of a stored character can be varied during readout as well as obtaining special characters by reading out a partial character. The width variability further enables multiple pitch capability in printing because of the variable clear area, and readily adapts to the requirements of proportional spacing and line justification.

The foregoing and other objects, features, and advantages of the invention will be apparent from the following more particular description of a preferred embodiment of the invention, as illustrated in the accompanying drawings.

BRIEF DESCRIPTION OF THE DRAWING

FIG. 3 is a table illustrating equivalent binary column addresses for defining both beginning and ending column addresses for characters of various even pel widths;

FIG. 4 is a definition table for a typical control half-word used for character retrieval in accordance with the present invention.

DESCRIPTION OF THE PREFERRED EMBODIMENT

Figures 1, 2:
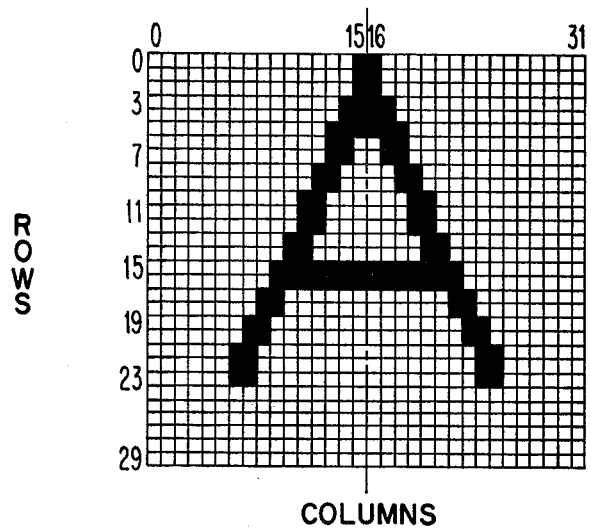
FIG. 1 represents a technique of storing a character for subsequent retrieval in accordance with the principles of the invention.
FIG. 2 is a table illustrating binary notation for various even pel widths for stored characters.

Referring to FIG. 1, there is shown an example of a character cell having rows and columns of binary bit storage positions or elements. Each storage or print element (pel) can be set to a binary "one" or "zero" state indicating either the presence or absence of a data bit. Such storage cells are well known in the art and can then have data permanently stored for readout only or can be writable for alteration. In the illustrated two-dimensional matrix, the storage elements are arranged as 30 rows by 32 columns thus having a total of 960 bit positions. The "row" and "column" designation is arbitrary. Certain of these bit positions have been darkened to represent the storage of "one" bits in the exemplary configuration of the character "A". The "A" is shown taking up an area within the cell having a height of 24 horizontal pel rows and a width of 20 vertical pel columns. A character generator for a printer has a plurality of such cells, each having a character stored therein in much the same manner as the illustrated "A" and each is addressable to read out the cell either as a succession of rows or columns of bits in parallel.

A character may be stored at a variety of locations within a cell. The location depends on factors such as storage capacity, addressing technique, and purposes such as variable pitch or proportional spacing. Heretofore characters have been retrieved by addressing and reading out the entire cell. Variable pitch was achieved by selecting the proper character width from among several prestored widths, and proportional spacing was accomplished by either prestoring the character with appropriate clear area or addressing a clear character of desired width for the space between adjacent characters.

Writable character generator modules are desirable, particularly with non-impact printers or displays since different font styles and sizes may be loaded when required. The loading may be initiated by a central processing unit or printer control unit with the data being stored on tape, disk, etc. The problem with this flexibility is that an additional parameter, the width of characters in a set must be known, so that only the bits associated with each character as it is to be printed are addressed. This becomes much more complicated when the character set is to have characters of different pitches or the characters are to be proportionally spaced.

This invention solves the above addressing problem as well as expanding the print versatility and capability of matrix type non-impact printers. It can also be applied where the character generator module is fixed, that is, where read only storage (ROS) modules are used instead of the random access memory (RAM) modules.

The character stored in FIG. 1 is symmetrically placed with respect to the vertical center axis of the cell which lies between columns 15 and 16 of the 32 column cell. When, as in this instance, the number of columns in each cell half are equal and numbered binarily and consecutively from one extreme edge to the opposite edge, then the address of a column in one-half of the cell is the complement of the address of a corresponding column in the other half of the cell. For instance, the first or "0" column in this example is represented as column 00000 in the binary code and the last or 31st column is represented as 11111, or column 15 being binarily 01111 has a corresponding column 16 represented as 10000.

If the total width of a stored character in pel columns is restricted to an even number of two or greater such as 2, 4, 6, etc., then as seen in FIG. 2, the least significant binary bit is always a one. The half-width of a character is then easily determined by dropping the last bit. As will be seen, the last bit is redundant and can be eliminated if the printing of a character having zero columns is not permitted. The 16, 8, 4, and 2 bits of FIG. 2 are then changed to 8, 4, 2, and 1 binary weights respectively with 0000 being equivalent to a half-pel width of one column.

The left or right half of the character cell can be identified by using a fifth stage "16" bit. The right half of the cell (columns 16-31) is indicated by using the half-pel width data with the added bit in the "16" position being set on to signify a stored "1". The left cell half of the addressable columns is indicated by the inversion of the half-pel data with the "16" bit being set to zero. The binary pel width and column identification for the half-pel width of the characters is shown in FIG. 3. It will be seen that the cell half is indicated by the zeros or ones in the "16" bit position of the Address Start Bits and the column number in that cell half is shown by the state of the 8, 4, 2 and 1 bit positions. For example, a desired character having a width of 24 pels would be addressed for reading from left to right by providing binary signals 00100 as a starting address and its complement 11011 as the ending address. Readout would start at column 4 and stop at column 27. If the cell character is to have a width of 20 pel columns, then six columns are to be omitted from each edge of the cell. In this instance and reading left to right, the readout starting address would be 00110 indicating column 6 which is the 7th column from the left edge and the stopping address would be 11001 (an inversion of the starting address) indicating column 25 which totals twenty columns from the starting address and is six columns from the right edge.

It is apparent from the foregoing that the transmission of character width data along with the character cell identification data will be adequate to select the amount of clear area that is to accompany a character when recorded. Hence, the character spacing or pitch of characters within a line can be selected merely by changing the width data.

The selection of a character and its width from among characters stored in the foregoing manner, is accomplished with minimal selection data. A selection half-word such as that defined in FIG. 4 provides the capability of font selection, character selection, width, and additional control bits. As seen in the figure, the first two interface bits 0 and 1, having binary weights as indicated, can be used to select one of four character generator modules having the particular type font desired. The selection of a character within a module is accomplished with interface bits 2–7, having the six binary weights indicated, and these can provide identification of one of 64 characters within a font. Interface bits 8–11 can be used for miscellaneous control, and interface bits 12–15, having four different binary weights, are used for the variable character width (VCW) desired. The control assigned to the various interface bits is, of course, optional so that the functions can be varied.

The character width can be defined by four binary bits, but an additional bit is necessary to define the cell half in which column readout is to start. Since circuits are simplified by being able to specify greater character widths by increasing binary values the VCW is stored as being a starting address in the right half of a character cell. Otherwise, greater widths would require decreasing binary values. The establishment of a starting address for reading out a character of any even pel width may be given by the following equation:

$$VCW = \frac{Pel\ Width}{2} - 1$$

Thus a character of 24 pel columns in width will have a VCW of decimal 11 or 1011 in binary notation. Since the VCW can be expressed with only four bits, the required cell half identification bit need not be stored as will be seen hereinafter.

Figure 5:
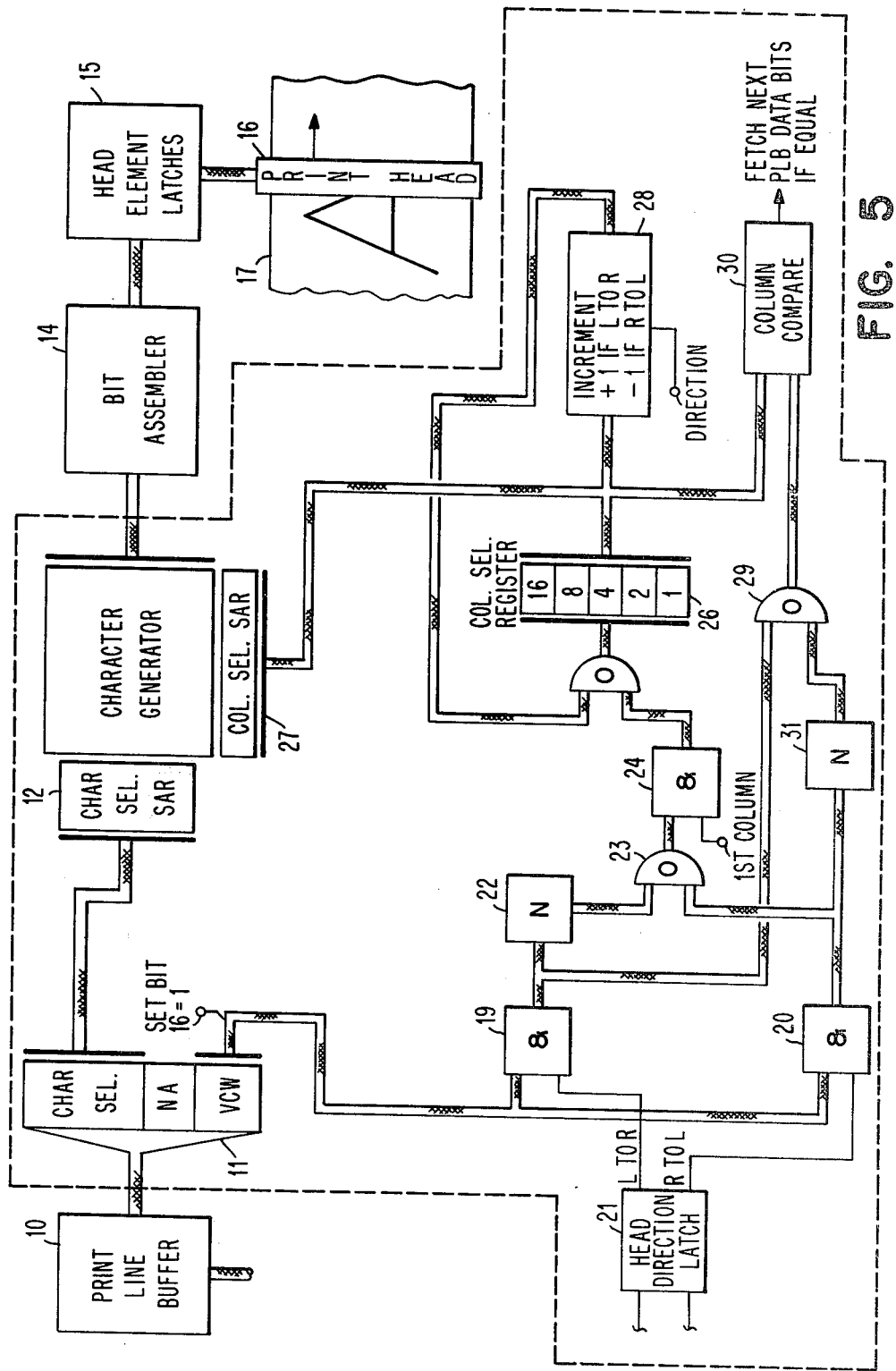
FIG. 5 is a schematic diagram of a circuit for retrieving stored character data in accordance with the principles of the present invention.

An example of a logic circuit for accomplishing character selection and corresponding width definition for printing is schematically shown in FIG. 5. The circuit portion within the dashed line is that for using the character and width data for the selection process, while the remaining circuit blocks represent apparatus usually operated in conjunction with the selection circuits in a matrix printing system. Character data required for a line of printing is assembled in a print line buffer 10 and the actual selection data is transmitted as half-words to the appropriate control circuits. In this instance, a cable having 16 conductors is schematically split to provide character selection data on eight lines and variable character width data on four lines at data bit register 11. The remaining four bit lines are for various other controls not pertaining to this invention and will not be further discussed. The eight bits of the character selection data are transmitted to character selection storage address register 12 at the writable character generator module 13 to select the font and character cell.

Bit data retrieved from character generator 13 are transmitted to bit assembler 14 which is used to temporarily accumulate and organize data prior to transmittal to the printhead. The printhead may cover multiple lines during a single pass, and, other character data would then be retrieved before such transmittal. From the assembler stages, bit data are then transferred to a plurality of respective head latches 15 which each control one of the plurality of print elements in printhead 16 to either produce a mark or not on record 17 according to the presence or absence of a bit.

Returning now to data bit register 11, the character selection data from bit positions 0–7 provide the font and character cell address of the selection data in the character generator. The variable character width data, bits 12–15, are transmitted to coincidence gates 19 and 20. However, another bit line is added to the VCW bits which has a binary weight of 16 to represent the starting column address as being on the right half of the character cell. Initially, the starting column addresses for the width are all transmitted for the right cell half because of the relative simplicity of determining variable character widths. Accordingly, the fifth binary width line is always set at a value of 1.

The VCW data are gated through coincidence gates 19 or 20 according to the direction of relative motion of head 16 with respect to record 17. This is determined by the output of latch 21 from which gate 19 is conditioned when movement is to be left to right and gate 20 is conditioned for movement right to left. Assuming, in this example, that the motion of printhead 16 is as indicated from left to right, the VCW data bits are transmitted to inverter 22 where all the width data bits are complemented. These values are then transmitted through OR circuit 23 to coincidence circuit 24. Since the character readout is just beginning, gate 24 is conditioned by a first column signal so that the VCW data bits are transmitted through OR circuit 25 to the column select register 26. Thus, if the character "A" is to be printed 24 pel columns wide, then its right cell starting address would have been transmitted to gate 19 as 11011 and subsequently complemented at inverter 22 to a starting address of 00100 indicating that the starting address is to begin in the left cell half at column 4.

The readout of the selected character begins with the starting address appearing in column select register 26 which is, in turn, transmitted to column select storage address register 27 for character generator 13. Since the rows of the character cell were already conditioned by the character select storage address register 12, the appearance of the column address results in the storage elements of that column being read out in parallel to the bit assembler, head latches, and printhead.

The appearance of the VCW data at register 26 also results in activation of an incrementing circuit 28, which may be a conventional up-down counter and is effective in this example to increase the value in register 26 by one so that the next column address is 00101 or column 5 in the cell. The change in the column identification in register 26 then appears as a new address in address register 27 so that the next succeeding column is read to the bit assembler, and subsequently to the head latches and printhead. Advancement of column addressing for readout thus continues until an ending address is encountered.

The establishment of an ending address is through the original VCW data from coincidence gate 19 which is transmitted without inversion through OR circuit 29 to column compare circuit 30. This original VCW value remains in the compare circuit and, as successive incrementing of the original inverted VCW data in the column select register occurs, the column readout value eventually compares equally with the initial VCW value. At that time, a signal is provided which indicates that the next print line buffer data bits should be fetched for the PLB 10 and new half-word transmitted to data bit register 11. The output signal from column compare circuit 30 blocks further column readout of the character generator until the next PLB character has been fetched.

If the printhead were moving in the opposite direction, right to left, the VCW data would be transmitted through coincidence gate 20, OR circuit 23, coincidence gate 24, OR circuit 25, directly to the column select register in true form. The comparison value for terminating readout would be obtained by complementing this starting address at inverter 31 and transmitting it through OR circuit 29 to column compare circuit 30. In this instance, the address would be successively decremented by one for each column at increment circuit 28.

As seen from the foregoing description, symmetrical storage of characters about a cell axis provides versatility in selecting character width beyond that previously known. In the past, the intermixing of character pitches within a line has been limited to the width of characters stored in the character generator or required complex selection addressing circuits. With the invention, there exists a wide choice with a limited number of character cells. Cell width, of course, can be varied as required, while keeping the character column total an even number.

Related to this is the need for more lengthly spaces between characters or words which formerly required the retrieval of several space characters which were usually stored and retrieved as full characters. With retrieval enabled by specifying variable character width, the spacing can be practically any number of pel columns desired with only one character cell which has all logical 0's. In like manner, if a character is stored with logical '1's, vertical lines of different selected widths can be easily retrieved.

A further capability lies in the creation of special characters by using only portions of characters through the limitation of character width to be read out from storage. For example, the conventional delta sign could be printed from the upper portion of the "A" shown in FIG. 1 merely by limiting the width of the character as read out. A minus sign or hyphen can be generated from the graphic H. The symbol < can be made from a portion of the graphic K. Logical OR and AND symbols can be made from the portions of the characters M or V and W, respectively, and a multiplication symbol can be made from the graphic X.

The stored character data may be in various forms for particular printing or displaying requirements. For example, reverse printing can be accomplished by unloading the cells from the high address to the low address when printing from left to right. It should be further noted that the circuit of FIG. 5 lends itself to time sharing operation in that columns in other cells can be read out in multiplex fashion when supplying data for larger printheads when simultaneoulsy recording multiple print lines.

While the invention has been particularly shown and described with reference to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. The method of retrieving stored data comprising the steps of:

storing data in locations symmetrically arranged about a datum point in a storage device;

defining the quantity of positions from which data is to be retrieved as a first address value of a location a predetermined number of positions from said datum point;

complementing said number to define a second address value corresponding to a location in said storage device in the opposite direction from said datum point;

applying one of said first and second address values to said storage device to read out the said location corresponding thereto in said storage device;

altering said one value by one after each position corresponding thereto has been read out to successively read out corresponding locations in a direction toward the other side of said data point; and comparing the address value of each location read out with the other of said first and second address values and terminating said readout when a said location address value and said other address value are equal.

2. The method as described in claim 1 wherein each said location is capable of storing a binary bit therein.

3. The method of retrieving elemental character data comprising the steps of:

storing character representation data in locations symmetrically arranged about a datum point in storage device;

defining the width of said character binarily as the number of locations from one side of said datum point;

complementing said width value;

applying one of said values to said storage device as a starting address to read out a said location corresponding to said value on one side of said datum point;

altering said one value by one after each location is read out to successively read out said corresponding locations toward the other side of said datum point; and comparing the address of each location read out with the other of said values and terminating said readout when a said location address and said other value are equal.

4. The method as described in claim 3 further including the step of establishing which of said values is to be said starting address according to the sequence in which said stored data are to be used.

5. The method of retrieving elemental character data for use in a printer of the matrix type comprising the steps of:

storing a representation of said character symmetrically about the central columnar axis of a storage matrix of binary elements arranged in rows and columns;

providing binary identification and width data for said character;

applying said identification data to condition the rows of said matrix for readout;

complementing said width data to provide both true and complemented binary values each representative of an address of a said column on opposite sides of said axis;

applying one of said values as a starting address for reading out a said matrix column intersecting said conditioned matrix rows;

altering said starting column address by one toward said other value after each column readout to produce readout of other columns in succession; and comparing each column readout address with the other of said binary values and terminating said column readout when a said column address and said other binary value are equal.

6. The method as described in claim 5 further including the step of supplementing said width data with another binary stage to identify said columns on one side of said axis as opposed to said columns on the other side of said axis.

7. The method as described in claim 5, further including the step of determining whether said true or complemented binary value is to be said starting address according to the desired direction of readout of said columns.

8. Apparatus for retrieving stored data comprising:

storage means for storing therein data at locations arranged symmetrically about a datum point of said storage means;

means indicating a number of data locations to be read out from said storage means;

means responsive to said number for providing both true and complemented binary values thereof, each corresponding to the address of a respective location on opposite sides of said datum point for readout from said storage means;

means responsive to one of said values for addressing and reading out the corresponding location in said storage means and successively advancing by one the said address value towards said other value to cause readout of other intermediate locations; and means for comparing the address location being read out with the other of said values and terminating said readout when said values compare equally.

9. Apparatus as described in claim 8 wherein said data locations are binary bit storage devices.

10. Apparatus as described in claim 8 wherein pluralities of said locations are arranged in columns and each said address value corresponds to a said column.

11. In a printer having relative motion between a recording member and a matrix printhead and having circuits for controlling marking elements of said printhead, apparatus for retrieving marking data for said control circuits comprising:

character storage means for storing a representation of a character in binary bit locations arranged symmetrically about a datum point of said storage means;

means indicating the width of said character to be read out of said storage means;

means responsive to said width signals for providing both true and complemented binary values thereof each corresponding to the address of a respective location on opposite sides of said datum point for readout in said storage means; and means responsive to one of said values for addressing and reading out the corresponding location of said storage means and successively advancing by one said address value toward said other value to cause the readout of other intermediate locations thereof until the location address equals the other of said values.

12. Apparatus as described in claim 11 wherein said locations corresponding to said true and complemented binary values are an equal number of locations from said axis on opposite sides thereof.

13. Apparatus as described in claim 11, further including means responsive to the direction of relative motion of said printhead and said record member for selecting which of said two complementary values is to be the beginning and ending location address during readout.

14. In an arrangement for printing characters, apparatus comprising:

character storage cell means for storing representations of each of a plurality of font characters in a matrix of row and column binary data bit positions, each said character representation being stored symmetrically about a center columnar axis of its said cell;

means for identifying for retrieval a selected one of said characters and the width thereof in binary signal sequences;

means responsive to said character identification signals for addressing the said storage cell of said character representation;

means responsive to said character width signals for providing both true and complemented binary values thereof corresponding to addresses of columns on opposite sides of said axis in said selected cell; and means responsive to one of said values for effecting readout of the corresponding column in said cell and successively advancing by one the readout address of other cell columns toward said other value until the column address equals said other value.

15. Apparatus as described in claim 14 wherein said readout means is responsive to said true value for addressing a column in said cell and incrementally advancing by one the column address for readout until said column address equals said complemented value.

16. Apparatus as described in claim 14 wherein said readout means is responsive to said complemented value of said width for initiating readout thereof and decrementally changing the column address for readout until said true value is attained.

17. In a printer providing relative motion between a recording member and a matrix printhead, and having circuits for controlling the marking of said printhead, apparatus for retrieving marking data for said control circuits comprising:

character storage cell means for storing representations of each of a plurality of font characters in a matrix of row and column binary data bit positions, each said character representation being stored symmetrically about a center columnar axis of its said cell;

means for identifying for retrieval a selected one of said characters and the width thereof in binary signal sequences;

means responsive to said character identification signals for addressing the storage cell of said character representation;

means responsive to said character width signals for providing both true and complemented binary values thereof as addresses corresponding to columns on opposite sides of said axis in said selected cell; and means responsive to said address values for effecting readout of the corresponding column in said cell and successively changing by one the address value for the each of other cell columns for readout until the column address equals the other of said values.

18. Apparatus as described in claim 17, further including means responsive to the direction of relative motion between said printhead and said record member for selecting which of said true and complemented binary values is the beginning and ending of said columnar addresses during said readout.

* * * * *